United States Patent
Li et al.

(10) Patent No.: US 10,795,081 B1
(45) Date of Patent: Oct. 6, 2020

(54) METHOD FOR MEASURING AND DYNAMICALLY MODULATING CHARACTERISTICS OF SLOW LIGHT IN PHOTONIC-CRYSTAL COUPLED-CAVITY WAVEGUIDE

(71) Applicant: Qingdao University, Qingdao (CN)

(72) Inventors: Changhong Li, Qingdao (CN); Yong Wan, Qingdao (CN); Nan Zhang, Qingdao (CN); Yufan Fang, Qingdao (CN); Chongqing Yan, Qingdao (CN)

(73) Assignee: Qingdao University, Qingdao (CN)

( * ) Notice: Subject to any disclaimer, the term of this patent is extended or adjusted under 35 U.S.C. 154(b) by 0 days.

(21) Appl. No.: 16/601,650

(22) Filed: Oct. 15, 2019

(30) Foreign Application Priority Data

Jun. 26, 2019  (CN) .......................... 2019 1 0560083

(51) Int. Cl.
*G02B 6/122* (2006.01)
*B82Y 20/00* (2011.01)
*H01P 1/20* (2006.01)
*G02B 6/12* (2006.01)

(52) U.S. Cl.
CPC ............ *G02B 6/1225* (2013.01); *B82Y 20/00* (2013.01); *H01P 1/2005* (2013.01); *G02B 6/1221* (2013.01); *G02B 2006/1219* (2013.01); *G02B 2006/12061* (2013.01)

(58) Field of Classification Search
None
See application file for complete search history.

(56) References Cited

U.S. PATENT DOCUMENTS

| | | | |
|---|---|---|---|
| 7,359,606 B2 * | 4/2008 | Ushida ..................... | G02F 1/365 385/125 |
| 7,397,994 B2 * | 7/2008 | Noda ..................... | B82Y 20/00 385/129 |
| 7,585,113 B2 * | 9/2009 | Lee ........................ | B81B 3/0013 384/147 |
| 2002/0048422 A1 * | 4/2002 | Cotteverte ............. | B82Y 20/00 385/4 |
| 2003/0026570 A1 * | 2/2003 | Malsuura .............. | G02F 1/0128 385/129 |
| 2003/0234972 A1 * | 12/2003 | Simon ....................... | G02F 1/31 359/321 |
| 2004/0027646 A1 * | 2/2004 | Miller ................ | G02B 6/12007 359/322 |
| 2013/0003159 A1 * | 1/2013 | Yeh ......................... | B82Y 20/00 359/290 |

* cited by examiner

*Primary Examiner* — Jerry Rahll

(74) *Attorney, Agent, or Firm* — Harness, Dickey & Pierce, P.L.C.

(57) ABSTRACT

A method for measuring and dynamically modulating characteristics of slow light in a photonic-crystal coupled-cavity waveguide is set forth. A photonic-crystal structure consists of a series of microcavity components formed by arranging silicon dielectric rods in triangular lattice structure in the substrate of organic polymer polystyrene with an electro-optical effect, a light waveguide structure being along the X direction, and regularly removing single silicon dielectric rods. The present disclosure has the beneficial effects that extremely high slow light effect and high-performance all-optical buffer are realized.

4 Claims, No Drawings

METHOD FOR MEASURING AND DYNAMICALLY MODULATING CHARACTERISTICS OF SLOW LIGHT IN PHOTONIC-CRYSTAL COUPLED-CAVITY WAVEGUIDE

CROSS-REFERENCE TO RELATED APPLICATIONS

This application claims priority to Chinese application number 201910560083.2, filed Jun. 26, 2019 with a title of Method For Measuring And Dynamically Modulating Characteristics Of Slow Light In Photonic-Crystal Coupled-Cavity Waveguide. The above-mentioned patent application is incorporated herein by reference in its entirety.

FIELD

The present disclosure belongs to the technical field of electro-optical transmission, and relates to characteristics of slow light in a photonic-crystal coupled-cavity waveguide (PC-CCW) and dynamic modulation thereof.

BACKGROUND

Compared with light in a line defect photonic-crystal waveguide, a photonic-crystal coupled cavity waveguide has slow-light transmission and can greatly reduce the transmission group velocity of light. When photons are propagated in the coupled-cavity waveguide, as long as mode fields between every two adjacent microcavities are overlapped sufficiently, once resonance oscillation is formed in a first microcavity, light transmission can be realized through weak coupling between the cavities. The strength of the weak coupling can be influenced by the sizes of background dielectric cylinders, the sizes of dielectric cylinders around cavities, the intervals between cavities and the background refractive index in the coupled-cavity waveguide structure respectively, and a transmission characteristic of slow light is further influenced. There is a very flat guide mode in a forbidden band of the photonic-crystal coupled-cavity waveguide, which is also one of the most outstanding characteristics. Compared with a line defect waveguide, the group index of the coupled-cavity waveguide is increased by one order of magnitude, and the coupled-cavity waveguide also has considerable NDBP.

SUMMARY

The present disclosure aims to provide a method for measuring and dynamically modulating characteristics of slow light in a photonic-crystal coupled-cavity waveguide, and the present disclosure has the beneficial effect that extremely high slow light effect and high-performance all-optical buffer are realized.

The technical proposal adopted in the present disclosure is as follows: a photonic-crystal structure consists of a series of microcavity components formed by arranging silicon dielectric rods in triangular lattice structure in the substrate of organic polymer polystyrene with an electro-optical effect, a light waveguide structure being along the X direction, and regularly removing single silicon dielectric rods Furthermore, a lattice constant a is 396 nm, the radius r of a background dielectric cylinder is 0.25a, the radius $r_0$ of a dielectric rod around a microcavity is 0.33a, the distance $\Delta$ between microcavities is n×a, and the length L of the waveguide is N×$\Delta$, wherein N is the number of supercell structures.

Furthermore, n in the photonic-crystal waveguide structure is 3.

Furthermore, along with constant increase of external modulating voltage, the frequency of a guide mode increases, the storage capacity of the guide mode is reduced constantly, the bit length is increased constantly, the quality factor and delay time are decreased constantly in an increasingly slow decrease rate, and the modulation sensitivity of the delay time is about 0.596 ps/mV.

DETAILED DESCRIPTION

The following describes the present disclosure in detail with reference to the specific embodiments.

A photonic-crystal structure of the present disclosure consists of a series of microcavity components formed by arranging silicon dielectric rods in triangular lattice structure in the substrate of organic polymer polystyrene with an electro-optical effect, a light waveguide structure being along the X direction, and regularly removing single silicon dielectric rods. In order to enable the photonic crystal waveguide to support guided mode transmission near the optical fiber communication band of 1550 nm, a lattice constant a is 396 nm, the radius r of a background dielectric cylinder is 0.25a, and the radius $r_0$ of a dielectric rod around a microcavity is 0.33a. The distance $\Delta$ between microcavities is n×a, and preferably, n in the photonic-crystal waveguide structure is 3; and the length L of the waveguide is N×$\Delta$, where N is the number of supercell structures. Under an optimal structure ($r_0$=0.33a), the storage capacity C reaches the maximum value 21.31 bit, the bit length reaches the minimum value 2.78 µm, the quality factor Q is 639.4, the delay time $T_s$ is 117.23 ps, the maximum group velocity $v_{gmax}$ of the guide mode is 0.00187c, and the NDBP reaches the maximum value 0.9259. Along with constant increase of external modulating voltage, the frequency of the guide mode increases, the storage capacity of the guide mode is reduced constantly, the bit length is increased constantly, the quality factor and delay time are decreased constantly in an increasingly slow decrease rate. Moreover, the modulation sensitivity of the delay time is about 0.596 ps/mV. A buffer characteristic of the photonic-crystal slow light structure can be analyzed and obtained by using a tight-binding method. The length L of the slow light waveguide is N×$\Delta$, so that the delay time $T_s$ is L/$v_g$, the storage capacity C is $T_s$B, where B is the base band bandwidth of input data. The storage capacity C is calculated through the following formula:

$$C = T_z \times B = \frac{L}{v_g} \times \frac{\Delta\omega'}{4\pi} = \frac{Lc}{2a} \times \frac{\Delta\omega}{v_g} = \frac{L}{2a} \times n_g \times \Delta\omega \quad (1)$$

where $\Delta\omega$ is a normalized guide mode bandwidth. And then, the physical length of 1 bit is stored, namely $L_{bit}$=L/C=2a/($n_g$×$\Delta\omega$).

The radiuses of integral dielectric cylinders are set to 0.15a, 0.2a, 0.25a, 0.3a, 0.35a and 0.4a respectively. At the moment, the slow light performance parameters corresponding to different radiuses of dielectric cylinders are as shown in Table 1.

As shown in Table 1, when the radius of the integral dielectric cylinder is increased to 0.4a from 0.15a, average group index of the guide mode is firstly increased constantly from 44.84, reaches the maximum value 480.51 when the radius of the dielectric cylinder is 0.3a, then begins to decrease along with the increase of the radius of the dielectric cylinder, and is decreased to 62.21 when the radius of the dielectric cylinder is 0.4a. Moreover, along with the increase of the radius of the dielectric cylinder, the NDBP is also firstly increased and then decreased, and reaches the maximum value 0.9268 when the radius is 0.3a. When measuring the characteristics of slow light transmission in a waveguide, the forbidden band width of the waveguide structure and the position of the guided mode in the PBG are also very important factors.

TABLE 1 average group index ($n_g$) of coupled-cavity waveguide slow light under different radiuses of dielectric cylinders, normalized bandwidth ($\Delta\omega$), NDBP and forbidden band center deviation value ($\Delta F$ = |forbidden band normalized center frequency − guide mode normalized average frequency|)

| Radius | $\bar{n}_g$ | $\Delta\omega(\omega a/2_{\pi TC})$ | NDBP | $\Delta F$ |
|---|---|---|---|---|
| 0.15a | 44.84 | 0.00377 | 0.5531 | 0.01738 |
| 0.2a | 285.36 | 0.00063 | 0.6244 | 0.00957 |
| 0.25a | 444.93 | 0.00043 | 0.6977 | 0.00269 |
| 0.3a | 480.51 | 0.0005 | 0.9268 | 0.01177 |
| 0.35a | 294.21 | 0.00029 | 0.3541 | 0.01392 |
| 0.4a | 62.21 | 0.00137 | 0.3861 | 0.01089 |

Influence of the radiuses of the dielectric cylinders around the cavities on slow light performance:

The transporting mechanism of a photonic-crystal coupled-cavity waveguide is weak coupling between microcavities, when the structures of the dielectric cylinders around the cavities are adjusted, the coupling strength between the microcavities can be changed, and then characteristics of slow light in the coupled-cavity waveguide are influenced. Therefore, the characteristics of slow light in the coupled-cavity waveguide further can be optimized by adjusting the sizes of the six dielectric rods around the microcavities. The radius r of the dielectric rod is 0.25a, in order to facilitate the adjustment of the sizes $r_0$ of the dielectric rods around the microcavities, a radius coefficient coff can be introduced, and then $r_0$ is coff×r. Firstly, coff is changed to 1.6 (with an interval of 0.1) from 1. When the radius coefficient coff is increased, the frequency of the slow light guide mode decreases, the group index is increased gradually, when coff is 1.4, the group index reaches the maximum value, at the moment, the maximum group velocity $v_{gmax}$ is 0.00091c, average group velocity $v_g$ is 0.00082c, and the NDBP is 0.3881. The normalized frequency of the guide mode is near 0.2506, and the difference $\Delta F$ from the forbidden band center value is 0.0034, at the moment, the guided mode can be effectively limited in the waveguide to be transmitted, the guide mode bandwidth is $8\times10^{-5}$, and the quality factor Q ($\omega_0/\Delta\omega$) reaches 3313.2.

And then, optimized analysis is carried out in combination with the buffer characteristic of the waveguide structure. The storage capacity C of the slow light waveguide is linearly increased along with the increase of coff, and the maximum value 20.51 bit is reached when coff is 1.3 ($r_0$=0.325a); and then, the storage capacity C is sharply decreased along with the continuous increased of coff, the storage capacity C reaches the minimum value 8.75 bit when coff is 1.4 ($r_0$=0.35a), and at the moment, the storage capacity is also linearly increased along with the increase of the radius coefficient coff. The change rule of the bit length of the return-to-zero code is opposite to the storage capacity C, which corresponds to the formula $L_{bit}$=L/C. Q factor is firstly slowly decreased and then increased along with the increase of the radius coefficient coff, and when coff is 1.4, the maximum quality factor 3313.1 is reached; and then, however, the value is sharply decreased along with the increase of the radius coefficient. The delay time $T_s$ is inversely proportional to the group velocity $v_g$, namely is directly proportional to the group index $n_g$.

In Table 2, important parameters of the transmission performance and buffer performance of slow light of the coupled-cavity waveguide under different radius coefficients are summarized. As shown in Table 2, the maximum group index is constantly increased along with the increase of the radius coefficient coff, the maximum value 3038.35 is reached when coff is 1.42, and then the value begins to be decreased along with the increase of coff. Simultaneously, the quality factor Q and the delay time $T_s$ also reach the maximum values, and the storage capacity and the NDBP reach the minimum values, so that the cache and transmission of slow light are not facilitated. However, when coff is 1.32, the storage capacity C and the NDBP both reach the maximum value, and the bit length reaches the minimum value. That is to say, the buffer characteristic and transmission characteristic of waveguide slow light reach optimal values simultaneously when coff is 1.32.

As shown in Table 2, when coff is 1.32, the maximum group velocity $v_{gmax}$ of the guide mode is 0.00187c, the center frequency of the guide mode is 0.25577, the normalized bandwidth is $4\times10^{-4}$, and the NDBP reaches the maximum value 0.9259. Therefore, a PC-CCW structure with coff of 1.32 supports broadband low-dispersion slow light transmission. The transmission performance and storage capacity of waveguide slow light are comprehensively considered, and the structure that coff ($r_0$=0.33a) is 1.32 serves as an optimal slow light structure of PC-CCW.

TABLE 2 transmission characteristic and storage characteristic parameters of waveguide slow light under different radius coefficients

| coff | $\bar{n}_{gmax}$ | $\Delta\omega$ ($\omega a/2_{\pi TC}$) | Q | $L_s$ (μm) | C(bit) | $T_s$(ps) | NDBP |
|---|---|---|---|---|---|---|---|
| 1.3 | 583.07 | 0.00043 | 597.78 | 20.51 | 20.51 | 104.95 | 0.8867 |
| 1.32 | 651.28 | 0.0004 | 639.43 | 21.31 | 21.31 | 117.23 | 0.9259 |
| 1.34 | 746.34 | 0.00031 | 820.95 | 18.93 | 18.93 | 134.34 | 0.8265 |
| 1.36 | 876.09 | 0.00017 | 1489.21 | 12.23 | 12.23 | 158.24 | 0.5366 |
| 1.38 | 1061.2 | 0.0001 | 2518.9 | 8.68 | 8.68 | 191.02 | 0.3829 |
| 1.4 | 1337.65 | 0.00008 | 3133.12 | 8.75 | 8.75 | 240.77 | 0.3881 |
| 1.42 | 3.38.35 | 0.00002 | 12472.5 | 4.97 | 4.97 | 546.9 | 0.2214 |
| 1.44 | 1166.73 | 0.00007 | 3545.35 | 6.68 | 6.68 | 210.01 | 0.2991 |
| 1.46 | 694.67 | 0.00013 | 1899.35 | 8.04 | 7.38 | 125.04 | 0.3325 |

The change of transmission characteristic and buffer performance of slow light are researched by adjusting external modulating voltage. The external modulating voltage is set to 0 mV, 20 mV, 40 mV, 60 mV, 80 mV and 100 mV respectively. The frequency of the guide mode is also constantly increased simultaneously along with constant increase of external modulating voltage. When the external voltages are 0 mV, 20 mV, 40 mV, 60 mV, 80 mV and 100 mV, the normalized frequency of the guide mode are 0.2558, 0.2569, 0.2574, 0.2579, 0.2583 and 0.2586 respectively. Moreover, average group index of the guide mode is continuously changed to 291 (100 mV) from 592.08 (0 mV). Along with the constant increase of the external modulating voltage, average group index of the guide mode is constantly decreased exponentially. Through further analysis, the relation between the external modulating voltage and a group index curve of the guide can be obtained, and along with the increase of the external modulating voltage, the guide mode increases and the group index is constantly decreased. In Table 3, several important slow light parameters under different modulating voltages are summarized. As shown in the table, under the modulation of different external voltages, the NDBP always keeps a larger value (greater than 0.8215), and it means that good wide band and low dispersion slow light transmission performance can be realized in the modulation process.

TABLE 3 guide mode center frequency ($F_0$), average group index $\bar{n}_g$ and NDBP under different modulating voltages (0 mV to 100 mV)

| U(mV) | $F_0$ | $n_g$ | NDBP |
|---|---|---|---|
| 0 | 0.2558 | 592.08 | 0.9529 |
| 20 | 0.2569 | 428.27 | 0.9004 |
| 40 | 0.2574 | 370.29 | 0.8919 |
| 60 | 0.2579 | 335.90 | 0.8598 |
| 80 | 0.2583 | 307.39 | 0.8450 |
| 100 | 0.2586 | 291.00 | 0.8215 |

Dynamic Modulation of Slow Light Buffer Characteristic

The rule of the buffer characteristic of the guide mode along with the change of the external modulating voltage is researched. Along with constant increase of the external modulating voltage, the storage capacity of the guide mode is constantly decreased to 19.12 bit from 21.31 bit, the bit length is constantly increased to 3.11 μm from 2.79 μm, and the quality factor Q (from 639.42 to 354.21) and delay time (from 117.23 ps to 54.62 ps) are constantly decreased exponentially. In Table 4, the buffer performance parameter of waveguide slow light under different modulating voltages are summarized. As shown in the table, under the modulation of different external voltages, the storage capacity C always keeps a larger value (greater than 19.12 bit), and it means that good slow light buffer performance can be realized in the modulation process.

TABLE 4 storage capacity C, bit length $L_s$, quality factor Q and delay time $T_s$ under different modulating voltages

| U(mV) | C(bit) | $L_s$(μm) | Q | $T_s$(ps) |
|---|---|---|---|---|
| 0 | 21.31 | 2.79 | 639.42 | 117.23 |
| 20 | 20.81 | 2.85 | 475.65 | 84.79 |
| 40 | 20.66 | 2.87 | 415.19 | 73.32 |
| 60 | 19.95 | 2.98 | 390.68 | 66.51 |
| 80 | 19.64 | 3.02 | 363.78 | 60.86 |
| 100 | 19.12 | 3.11 | 354.21 | 57.62 |

And then, further study is carried out on the sensitivity of the external voltage for the buffer characteristic of the proposed photonic-crystal structure.

The storage capacity with the waveguide length of 1 mm is analyzed. When the applied modulating voltage is 0 mV, 20 mV, 40 mV, 60 mV, 80 mV and 100 mV, the group velocity is $1.88 \times 10^{-3}$ c, $2.34 \times 10^{-3}$ c, $2.7 \times 10^{-3}$ c, $2.98 \times 10^{-3}$ c, $3.25 \times 10^{-3}$ c and $3.44 \times 10^{-3}$ c, and the corresponding delay time is 117.23 ps, 84.79 ps, 73.32 ps, 66.51 ps, 60.86 ps and 57.62 ps respectively. It shows that, when the group velocity is increased, and the corresponding delay time is decreased exponentially along with the increase of the applied voltage. Moreover, the modulation sensitivity of the delay time is about 0.596 ps/mV. The results show that the delay time of PC-CCW can be controlled flexibly by accurately adjusting the applied modulating voltage. Therefore, for the fixed structure PC-CCW, the slow light transmission performance and storage performance of the waveguide can be controlled flexibly by adjusting the external modulating voltage.

The foregoing descriptions are merely exemplary embodiments of the present disclosure, but are not limitation of the present disclosure in any form. Any simple modification, equivalent change, or modification made for the embodiments according to the technical essence of the present disclosure shall fall within the scope of the technical proposal of the present disclosure.

What is claimed is:

1. A method for measuring and dynamically modulating characteristics of slow light in a photonic-crystal coupled-cavity waveguide comprising:
    forming a photonic-crystal structure consisting of a series of microcavity components formed by,
    arranging silicon dielectric rods in triangular lattice structure in the substrate of organic polymer polystyrene with an electro-optical effect, a light waveguide structure being along the X direction; and
    regularly removing single silicon dielectric rods.

2. The method for measuring and dynamically modulating characteristics of slow light in a photonic-crystal coupled-cavity waveguide according to claim 1, wherein a lattice constant a is 396 nm, the radius r of a background dielectric cylinder is 0.25a, the radius $r_0$ of a dielectric rod around a microcavity is 0.33a, the distance Δ between microcavities is n×a, and the length L of the waveguide is N×Δ, wherein N is the number of supercell structures.

3. The method for measuring and dynamically modulating characteristics of slow light in a photonic-crystal coupled-cavity waveguide according to claim 1, wherein n in the photonic-crystal waveguide structure is 3.

4. The method for measuring and dynamically modulating characteristics of slow light in a photonic-crystal coupled-cavity waveguide according to claim 1, wherein along with constant increase of external modulating voltage, the frequency of a guide mode increases, the storage capacity of the guide mode is reduced constantly, the bit length is increased constantly, the quality factor and delay time are decreased constantly in an increasingly slow decrease rate, and the modulation sensitivity of the delay time is about 0.596 ps/mV.

* * * * *